US009266751B1

(12) United States Patent
Suratt

(10) Patent No.: US 9,266,751 B1
(45) Date of Patent: Feb. 23, 2016

(54) WASTEWATER PURIFICATION SYSTEM

(71) Applicant: Ted Suratt, Clearwater, FL (US)

(72) Inventor: Ted Suratt, Clearwater, FL (US)

( * ) Notice: Subject to any disclaimer, the term of this patent is extended or adjusted under 35 U.S.C. 154(b) by 0 days.

(21) Appl. No.: 14/689,801

(22) Filed: Apr. 17, 2015

(51) Int. Cl.
*C02F 1/46* (2006.01)
*C02F 1/461* (2006.01)
*C02F 1/32* (2006.01)

(52) U.S. Cl.
CPC ............... *C02F 1/46104* (2013.01); *C02F 1/32* (2013.01); *C02F 2303/04* (2013.01)

(58) Field of Classification Search
CPC ........... B01D 61/48; C02F 5/00; C02F 1/283; C02F 1/441; C02F 1/46; C02F 2209/40
See application file for complete search history.

(56) References Cited

U.S. PATENT DOCUMENTS

2012/0085691 A1* 4/2012 Cummins ................. C02F 9/00
210/192

* cited by examiner

*Primary Examiner* — Walter D Griffin
*Assistant Examiner* — Cameron J Allen
(74) *Attorney, Agent, or Firm* — Patent CEO; Phillip Vales

(57) ABSTRACT

An external tank has a biological destructive lighting system mounted perpendicularly to an electrolytic device within an externally mounted pipe. This pipe has an inflow from a source and an outflow connected to the side of the tank that has a tangentially mounted flow directional device facilitating tangential flow therein. An inner tank housed within the external tank has one or more holes at its bottom portion for permitting liquids to flow therein and up through a outflow piping system connected to an upper conical portion of the inner tank; the clean water flowing therein flows out through a top portion of the external tank using this outflow pipe. A waste pipe is mounted to a side of the external tank facilitating the removal of unwanted materials therefrom including solids like sand and liquids like oil.

20 Claims, 4 Drawing Sheets

WASTEWATER PURIFICATION SYSTEM

CROSS REFERENCE TO RELATED APPLICATIONS

The present application claims benefit of earlier filed provisional patent application 62/138,940 filed on 26 Mar. 2015.

FIELD OF THE INVENTION

The present invention relates to a system of wastewater purification. More particularly, the invention is directed to the field of endeavor that sanitizes the wastewater and removes undesirable materials such as lifeforms, soils and or suspended solids therefrom.

BACKGROUND OF THE INVENTION

Currently, there are various ways to purify water including distillation, reverse osmosis filtration and deionization. However, in most cases removing materials such as sand, metals, petroleum products, as well as eliminating bacteria and algae renders the purification process both expensive and slow. To solve these problems, engineers have created large reclamation systems.

Typically, three tanks are manufactured and laid out to permit the settlement of sand and other suspension materials to the bottom of the tanks; ordinarily, this process happens in still lakes wherein the materials simply sink to the bottom of the lake. Thus, because this settlement process requires a large amount of time, each of the tanks needs to be enormous so as to permit a large amount of water to be processed for a particular city, factory, car wash or other environment.

Contaminated water enters a first tank and once filled it proceed over a dam between the first and into the second tank. Here oil and hydrocarbons are permitted to rise to the surface thereof before a float valve is opened thereby allowing water to flow from the center of the tank into the third tank. There the water is cleaner than in the other two tanks such that it is substantially freer of oil and suspended solids than in the other tanks.

However, this type of system creates other problems unrelated to the removal of sand, oils and other suspended materials. In particular, the large volume of water tends to promote the growth of bacteria, algae and other lifeforms; this thereby creates a further treatment issue that needs to be dealt with before the water may be put back into circulation.

Thus, there needs to be a solution that separates the water from solids, oils and organics that does not have the disadvantage of lengthy processing time as well as overcomes the problems of large volume inherent in prior art systems. Further, it would be desirable for such a system to not use water filtration.

Accordingly, there remains a need in the art for an inexpensive compact system that meets all of these requirements.

SUMMARY OF THE INVENTION

The present invention overcomes the deficiencies of the known art and the problems that remain unsolved by providing a method and respective apparatus for purification of water systems as taught below.

A water sanitizing system comprising:
an external tank having a first inflow port and a first outflow port
and
an internal tank situated within the external tank such that the internal tank has a second inflow port at a bottom portion thereof and a second outflow port such that the second outflow port communicates through a channel device with the first outflow port wherein the first outflow port and the second outflow port are each attached to the channel device.

In another aspect,
a rotational flow control device disposed internally to the external tank and attached to the first inflow port.

In another aspect,
a first pipe having
an electrolytic device disposed therein and
a germicidal light device disposed therein
the first pipe attached to
an outside surface of an external tank and
an inner tank disposed within the external tank.

In another aspect, further comprising:
a first pipe attached to a portion of the external tank having
an electrolytic device disposed therein and
a germicidal light device disposed therein.

In another aspect, wherein the germicidal light device is disposed externally to the electrolytic device and perpendicular thereto.

In another aspect,
a second pipe from a top portion of the inner tank flowing out through a hole in the external tank.

In another aspect,
a hole at a side portion of the inner tank near a bottom of the external tank.

In another aspect,
a group of holes at a side portion of the inner tank near a bottom of the external tank.

In another aspect, wherein the inner tank further comprises:
a conical portion.

In another aspect, wherein the inner tank further comprises:
a straight portion.

In another aspect,
a conical portion at a top of the inner tank connected to a second pipe that flows through a hole in the external tank and a bottom cylindrical portion sitting within and at a bottom of the external tank.

In another aspect, an intermediate pipe connecting an upper portion of the first pipe with a first inflow port in an upper portion of the external tank.

In another aspect, a rotational flow control device disposed internally to the external tank and attached to the first inflow port.

In another aspect,
a waste pipe connected to an upper portion of the external tank.

In another aspect, a heavy material valve associated with the waste pipe.

In another aspect, a liquid material valve associated with the waste pipe.

A liquid cleansing device comprising:
a germicidal and electrolytic device attached to
an outside portion of an external tank having an inner tank housed therein such that the germicidal and electrolytic device has an intermediate pipe connected between itself and a hole in the external tank and
the inner tank has a clean outflow pipe at its top portion extending through another hole in the top portion of the external tank.

In another aspect, a perforation in a bottom side portion of the inner tank.

In another aspect, a waste outflow pipe mounted on an outside surface of the external tank.

an external tank having
    a first inflow port and
    a first outflow port such that the external tank circumscribes
an internal tank having
    an outflow pipe connected thereto at a second outflow port of the internal tank and the outflow pipe is also connected to the first outflow port of the external tank and the internal tank has
    a bottom portion with an inflow orifice.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each figure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present embodiment is designed to slow the speed of incoming sump water and control the direction of liquid flow. Further, a pipe and inner chamber prevents incoming turbulent water from being mixed with the clean outgoing water. As incoming water enters the first part of the system, it is treated with a short wave lighting system and then later with electrolysis such that the water is first sanitized and then polarized. As a result, the water's buoyancy is lowered and bacteria therein are killed and emulsifying compounds that keep oil and other petroleum products in suspension are destroyed thereby. An additional feature is that the device has a drain valve that drains off and preserves the separated oil from the top for further use as well as a valve for disposing of sand and suspended solids on the bottom.

A typical application of the herein disclosed embodiment is in a car washing system, ship ballast cleansing, oil spill cleanup upon a water body, or any other place suspended solids and oil other organics need to be removed from water. The system is ideal for fracking water used in the oil industry as it both separates the contaminants and sanitizes the water before being reused or returned to our lakes and reservoirs.

Figure 1:
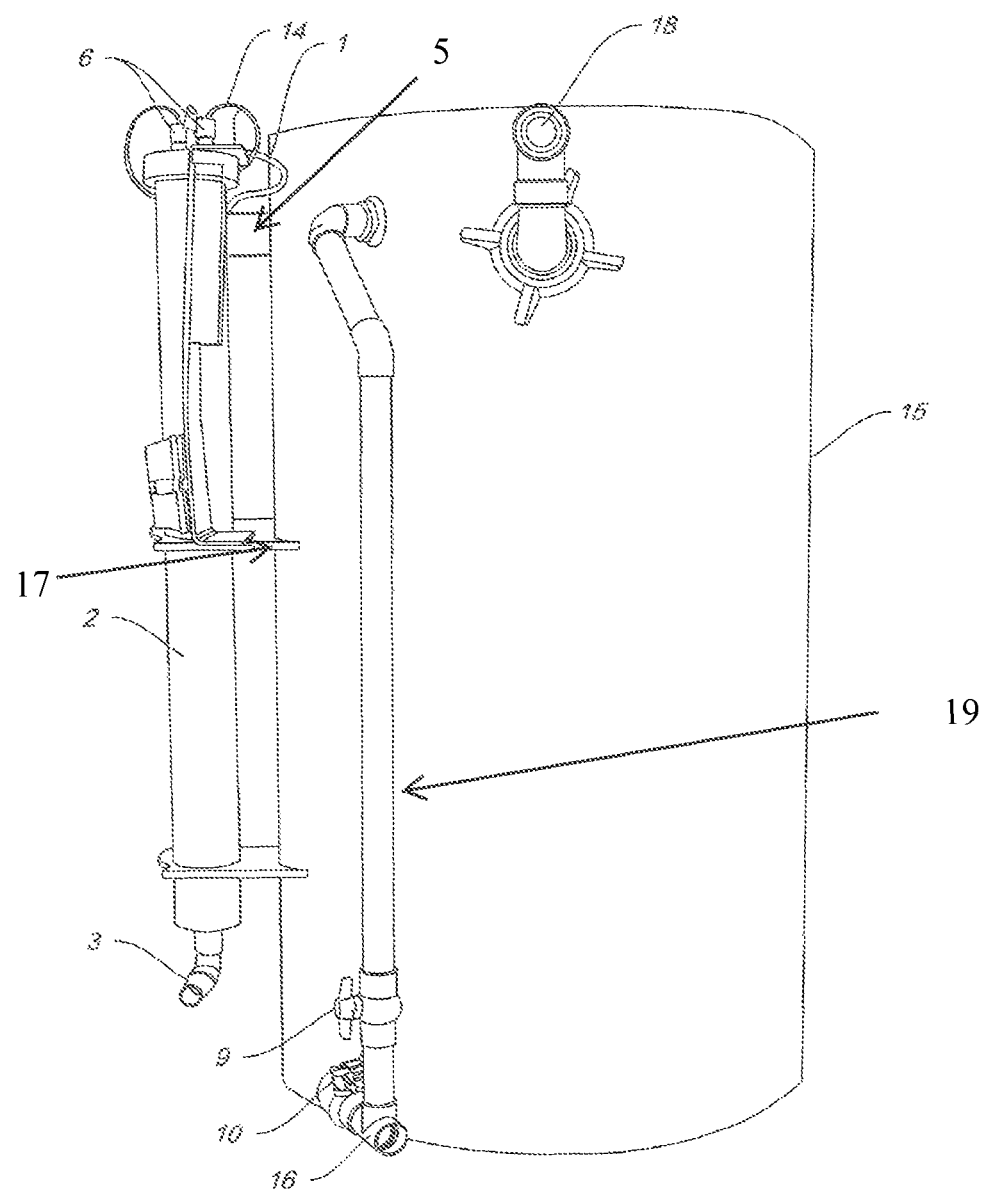
FIG. 1 presents a front elevation view of a Wastewater Purification System as taught in an embodiment.

FIG. 1 presents a front elevation view of a Wastewater Purification System as taught in an embodiment. A Wastewater Purification System as taught herein has various components comprising: a germicidal and electrolytic unit having a lighting system 4 and electrodes 6, a high density polyethylene HDPE black pipe 2, an intake port 3, a shortwave lighting system 4, a connection tube 5, electrodes 6, inner tank 7, reverse cone tank portion 7A, cylinder tank portion 7B, cylinder tank portion holes 8, oil drain valve 9, bottom sand valve 10, electrode wires 14, lighting wires 1, water tank 15, elbow connection pipe 16, two side mounts 17, clean water outflow port 18, waste water outflow pipe 19, clean water outflow pipe 20 and a float switch (not shown). A power source, rectifier and other powering devices are mounted externally to pipe 2 but are not primary to the novelties herein described. The float switch in a reservoir tank (not shown) controls power to the lighting 1 (wire) and electrolytic systems wires 14 making this an automatic system.

A water tank 15 forms the main portion of the system for sanitizing water; this system has two main components mounted on the outside of the tank 15 in a pipe. The first component is this pipe 2 housing a short wave lighting system (FIG. 4, 4) and an electrolysis unit (FIG. 4, 6) used to treat the water. The second component 19 is an waste outflow pipe attached at the external upper side of the water tank 15 and the external lower side of the water tank 15.

It is known that salt water increases conductivity and that electrolysis can destroy most bacteria in salt water. Thus, electrolysis is used to kill bacteria but because conductivity is low in fresh water, a germicidal bulb must be used to kill the remaining bacteria. Thus, the short wave lighting system 4 uses a 254 nanometer wavelength bulb arranged about the vertically disposed electrodes 6 (FIG. 4) with the light waves directed inwards towards the center of the tube 2. This creates a magnetic field as the electron flow is perpendicular to the light waves thereby orienting the bacteria in the water flow and improving the kill rate thereof.

A water source (not shown) provides water to the system through intake port 3 attached to the bottom portion of the pipe 2. Water is treated therein using a short wave lighting system 4 and an electrolysis unit 6. This treatment kills bacteria, polarizes the water and thereby lowers its buoyancy and further breaks any emulsions that suspend oils in the water. As the water moves upwards in the pipe 2 it proceeds through an opening in the side wall of the pipe 2 and enters a connection tube 5 having a single entry and a single exit; this tube 5 is shaped conveniently from a plastic or metal mold such that its entry makes a water tight seal on the pipe 2 and on its exit makes a similar seal with an opening in the side of tank 15 at its top external side.

Figure 3:
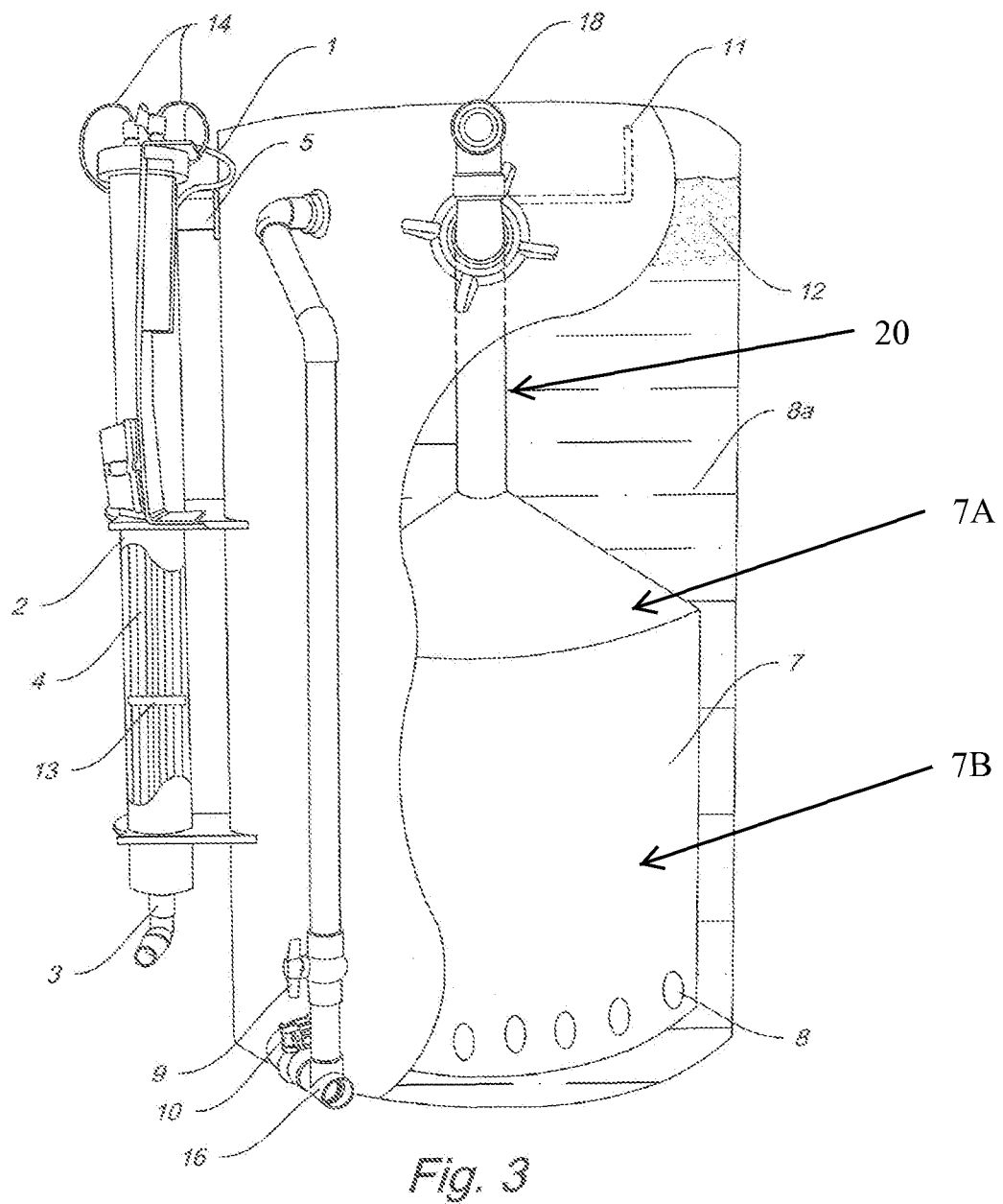
FIG. 3 presents a front cross-section view of the various components found in a Wastewater Purification System as taught in an embodiment.

As the water enters the tank 15 from connector tube 5 and pipe 2 it enters a tangentially disposed tube or elbow pipe (not shown) connected internally to the external tank 15 at the upper side opening also connected to connection tube 5. This arrangement compels the fluid flow to follow a tangential path about the inner surface of the external tank 15. Thus, the soiled water begins to swirl around therein without affecting the outgoing water from outflow port 18 or water in the inner tank 7 (FIG. 3). Because of the dynamics of the water as it flows therein from tube 5, centrifugal force and the mechanical disposition of the inner tank 7 maintain the sand and the other solids at the outer edge of the holding tank 15. Additionally, gravity and buoyancy begin to separate the oil and sand 12 (FIG. 3) thereby sinking the sand to the bottom and permitting the oil to float to the top thereof.

The inner tank 7 has two portions a top portion 7A and a bottom portion 7B; the top portion is shaped as a reverse cone 7A and the bottom portion is cylindrical 7B attached (welded or formed as one unit at manufacture) at one end thereof to the larger bottom edge of the reverse cone top portion 7A and at the other end to the bottom of the tank 15. Oval openings 8 at the sides near the bottom portion of the cylindrical 7B portion of inner tank 7 allow water flow from the water tank 15 into the inner tank 7. Clean water thereby proceeds upwards through the bottom cylindrical portion 7B up through conical portion 7A and on into an outflow pipe 20. This outflow pipe 20 integrally formed or connected to a hole in the top narrow portion of cone portion 7A, makes a water tight connection to a hole in the side of the tank 15. The water flow proceeds to outflow pipe 18 similarly water tight connected to this hole in the side of tank 15 also connected to pipe 20 where it can be retrieved therefrom. Of course, pipes 18 and 20 are optionally the same pipe for simplicity. Other water tight seal fittings also shown but not discussed further for simplicity.

A waste water outflow pipe 19, is connected to the top portion of the external tank at a hole therein and at its bottom side has an elbow connection pipe 16 having a bottom sand valve 10 therein that when activated permits sands to be extracted from tank 15 through the T fitting described below. The other side of the elbow connection pipe 16 is connected to a hole in the lower side surface of the external tank 15. A single T fitting connects the elbow connection pipe 16 to the outflow pipe 19. Additionally, an oil drain valve 9 is found in the waste water outflow pipe 19 for emission of liquid waste when this valve is opened.

Figure 2:
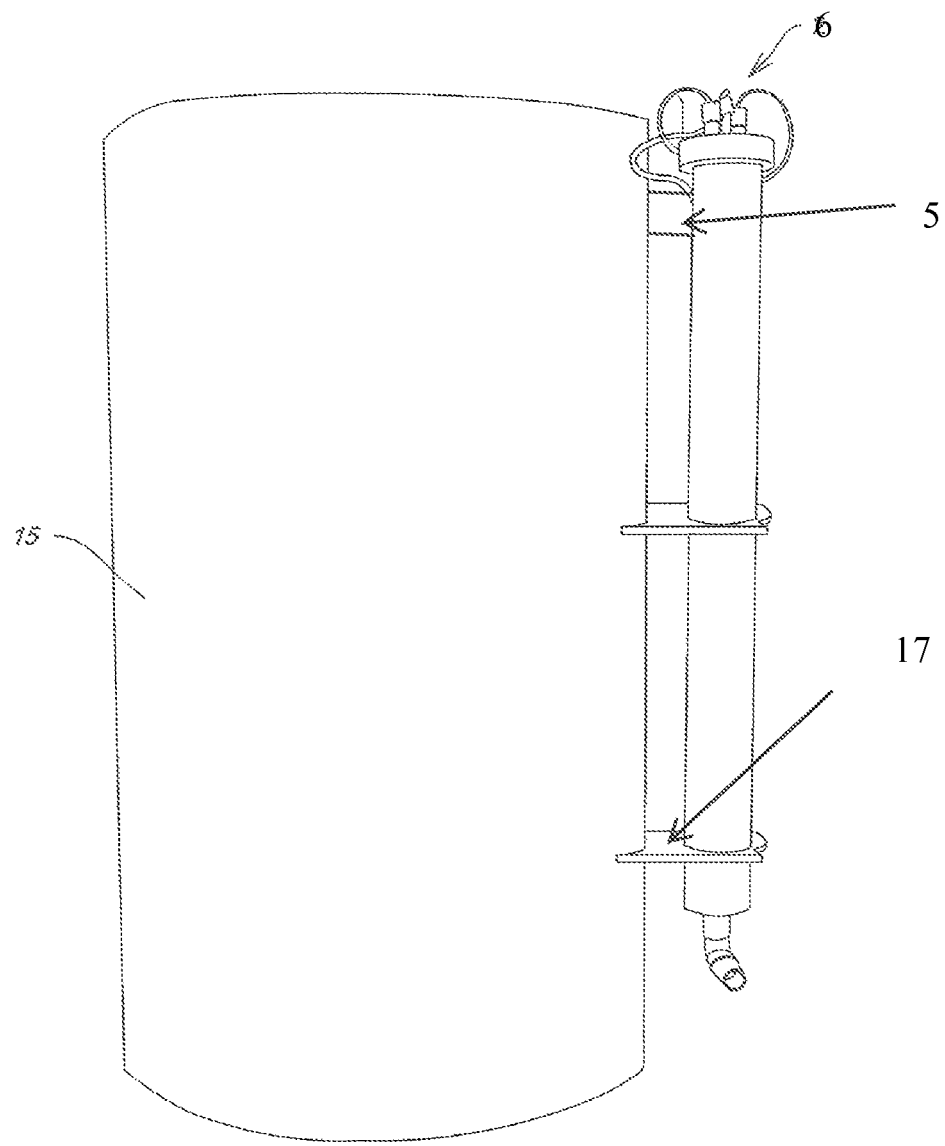
FIG. 2 presents a rear elevation view of a Wastewater Purification System as taught in an embodiment.

FIG. 2 presents a rear elevation view of a Wastewater Purification System as taught in an embodiment.

FIG. 3 presents a front cross-section view of the various components found in a Wastewater Purification System as taught in an embodiment. An anti siphoning device 11 is an L shaped pipe that functions to prevent the tank water from draining below the fill level when the pipe is not running. It is connected to outflow pipe 20 as it meets the hole in the side of the tank and proceeds to outflow port 18 (integrally or connected with appropriate plumbing fittings, adhesives, welds if using metal materials); the top end of the L shaped pipe is open to prevent siphoning from pipe 18.

Figure 4:
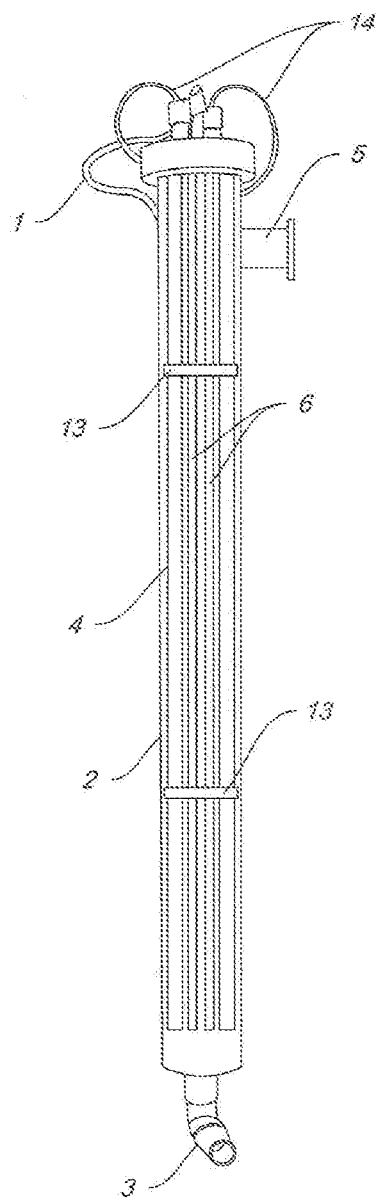
FIG. 4 presents a front cross-section view of a high density polyethylene HDPE tube found in a Wastewater Purification System as taught in an embodiment.

FIG. 4 presents a front cross-section view of a high density polyethylene HDPE tube found in a Wastewater Purification System as taught in an embodiment. The lighting system 4 is disposed perpendicularly to the electrodes 6 using cross shaped mounts 13. These mounts have holes therein for the attachment of the electrodes and lighting system and are glued within tube 2 at appropriate locations therein. The electrodes 6 are further mounted within holes at the top of pipe 2 and the lighting system 4 is similarly mounted in hole(s) that permit them to be perpendicularly disposed as discussed previously. Appropriate seals are provided to prevent outflow through these mounting holes.

Final Considerations:

The input hole (connected to 5) and the oil drain outflow hole for outflow pipe 19 at the top are even or level at the bottom of the holes. Also, the clean water output hole for clean water outflow port 18 is about 10 inches below this level so the crossover pipe is under water and doesn't create turbulence or interfere with the centrifugal force of the water swirling around the tank. The double elbow attached outside the tank makes the exit point level with the inlet hole so the tank remains full. Finally, the anti-siphon pipe prevents the water, flowing to a lower point outside, from siphoning out of the tank when the pump is not running.

Generalities:

It should be apparent that the devices herein including pipes and tanks are made from any suitable man made material such as PVC, plastics or metals. The pipes described are water tight with suitable plumbing material connections and adhesive materials or welded together as required.

Finally, the above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed, but that the invention will include all the embodiments falling within the scope of the appended claims.

What is claimed is:

1. A water sanitizing system comprising:
   an external tank having a first inflow port and a first outflow port
   and
   an internal tank situated within the external tank such that the internal tank has a second inflow port at a bottom portion thereof and a second outflow port such that the second outflow port communicates through a channel device with the first outflow port wherein the first outflow port and the second outflow port are each attached to the channel device.

2. The water sanitizing system of claim 1, further comprising:
   a rotational flow control device disposed internally to the external tank and attached to the first inflow port.

3. A water sanitizing system comprising:
   a first pipe having
      an electrolytic device disposed therein and
      a germicidal light device disposed therein
   the first pipe attached to
      an outside surface of an external tank and
   an inner tank disposed within the external tank.

4. The water sanitizing system of claim 1, a further comprising:
   a first pipe attached to a portion of the external tank having
      an electrolytic device disposed therein and
      a germicidal light device disposed therein.

5. The water sanitizing system of claim 4, wherein the germicidal light device is disposed externally to the electrolytic device and perpendicular thereto.

6. The water sanitizing system of claim 3, further comprising:
   a second pipe from a top portion of the inner tank flowing out through a hole in the external tank.

7. The water sanitizing system of claim 3, further comprising:
   a hole at a side portion of the inner tank near a bottom of the external tank.

8. The water sanitizing system of claim 3, further comprising:
   a group of holes at a side portion of the inner tank near a bottom of the external tank.

9. The water sanitizing system of claim 3, wherein the inner tank further comprises:
   a conical portion.

10. The water sanitizing system of claim 3, wherein the inner tank further comprises:
    a straight portion.

11. The water sanitizing system of claim 3, wherein the inner tank further comprises:
    a conical portion at a top of the inner tank connected to a second pipe that flows through a hole in the external tank and a bottom cylindrical portion sitting within and at a bottom of the external tank.

12. The water sanitizing system of claim 4, further comprising:
    an intermediate pipe connecting an upper portion of the first pipe with a first inflow port in an upper portion of the external tank.

13. The water sanitizing system of claim 1, further comprising:
    a rotational flow control device disposed internally to the external tank and attached to the first inflow port.

14. The water sanitizing system of claim 1, further comprising:
    a waste pipe connected to an upper portion of the external tank.

15. The water sanitizing system of claim 14, further comprising:
    a heavy material valve associated with the waste pipe.

16. The water sanitizing system of claim 14, further comprising:
    a liquid material valve associated with the waste pipe.

17. A liquid cleansing device comprising:
    a germicidal and electrolytic device attached to
    an outside portion of an external tank having an inner tank housed therein such that the germicidal and electrolytic device has an intermediate pipe connected between itself and a hole in the external tank and
    the inner tank has a clean outflow pipe at its top portion extending through another hole in the top portion of the external tank.

18. The liquid cleansing device of claim 17, further comprising:
    a perforation in a bottom side portion of the inner tank.

19. The liquid cleansing device of claim 17, further comprising:
    a waste outflow pipe mounted on an outside surface of the external tank.

20. An external tank having
    a first inflow port and
    a first outflow port such that the external tank circumscribes
    an internal tank having
    an outflow pipe connected thereto at a second outflow port of the internal tank and the outflow pipe is also connected to the first outflow port of the external tank and the internal tank has
    a bottom portion with an inflow orifice.

* * * * *

UNITED STATES PATENT AND TRADEMARK OFFICE
CERTIFICATE OF CORRECTION

PATENT NO. : 9,266,751 B1
APPLICATION NO. : 14/689801
DATED : February 23, 2016
INVENTOR(S) : Ted Suratt Page 1 of 1

It is certified that error appears in the above-identified patent and that said Letters Patent is hereby corrected as shown below:

Specification

In column 1, lines 6-7 should be deleted (no claim was made to this priority):

"The present application claims benefit of earlier filed provisional patent application 62/138,940 filed on 26 Mar. 2015."

Signed and Sealed this
Twelfth Day of July, 2016

Michelle K. Lee
*Director of the United States Patent and Trademark Office*